(12) United States Patent
Tsuruta et al.

(10) Patent No.: US 9,790,709 B2
(45) Date of Patent: Oct. 17, 2017

(54) KEY CYLINDER DEVICE

(71) Applicant: KABUSHIKI KAISHA TOKAI RIKA DENKI SEISAKUSHO, Aichi (JP)

(72) Inventors: Hiroshi Tsuruta, Aichi (JP); Takumi Tamezane, Aichi (JP); Tomonori Kawachi, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 27 days.

(21) Appl. No.: 14/982,867

(22) Filed: Dec. 29, 2015

(65) Prior Publication Data
US 2016/0194901 A1 Jul. 7, 2016

(30) Foreign Application Priority Data

Jan. 7, 2015 (JP) ................................ 2015-001415

(51) Int. Cl.
| E05B 9/04 | (2006.01) |
| E05B 29/00 | (2006.01) |
| E05B 15/00 | (2006.01) |
| B60R 25/02 | (2013.01) |
| E05B 77/38 | (2014.01) |

(Continued)

(52) U.S. Cl.
CPC .......... *E05B 29/0033* (2013.01); *B60R 25/02* (2013.01); *E05B 9/086* (2013.01); *E05B 15/004* (2013.01); *E05B 77/38* (2013.01); *E05B 85/06* (2013.01)

(58) Field of Classification Search
CPC ...... E05B 29/0033; E05B 9/086; E05B 77/38; E05B 85/06; E05B 15/004; B60R 25/02; Y10T 70/7667; Y10T 70/7672
USPC .......... 70/182–186, 252, 372, 373, 449, 466
See application file for complete search history.

(56) References Cited

U.S. PATENT DOCUMENTS 2,937,045 A * 5/1960 Leslie ................... E05B 1/0038
292/336.3
3,303,678 A * 2/1967 Bernard .................. E05B 77/34
70/373

(Continued)

FOREIGN PATENT DOCUMENTS

| DE | 3224630 A1 | 1/1984 |
| JP | 3346706 B2 | 11/2002 |

(Continued)

OTHER PUBLICATIONS

Extended European Search Report for corresponding European Patent Application No. 15202994.8, dated Jun. 3, 2016.

(Continued)

*Primary Examiner* — Lloyd Gall
(74) *Attorney, Agent, or Firm* — Roberts Mlotkowski Safran Cole & Calderon P.C.

(57) ABSTRACT

A key cylinder device includes a key cylinder attached inside a cylinder portion of a cylindrical mounting member and locked/unlocked by a mechanical key, and a packing insertion portion that is integrally formed on an outer surface of the key cylinder so as to have a shape without an undercut portion and includes an opening for insertion of a packing member in a vertical direction along the outer surface.

10 Claims, 6 Drawing Sheets

(51) Int. Cl.
*E05B 85/06* (2014.01)
*E05B 9/08* (2006.01)

(56) References Cited

U.S. PATENT DOCUMENTS

| | | | | |
|---|---|---|---|---|
| 5,038,589 | A * | 8/1991 | Martin | E05B 9/084 70/368 |
| 5,410,898 | A * | 5/1995 | Shieh | B60R 25/20 70/271 |
| 5,634,359 | A * | 6/1997 | Huebschen | E05B 9/086 70/367 |
| 5,931,035 | A * | 8/1999 | Bolton | E05B 9/084 70/367 |
| 8,756,963 | B2 * | 6/2014 | Le | E05C 1/14 292/169 |

FOREIGN PATENT DOCUMENTS

| | | |
|---|---|---|
| JP | 2003239597 A | 8/2003 |
| JP | 2006152627 A | 6/2006 |
| JP | 2014105498 A | 6/2014 |
| WO | 2010118988 A1 | 10/2010 |

OTHER PUBLICATIONS

Chinese Patent Application No. 201510957968.8 Office Action, dated Jul. 3, 2017, and English translation thereof.

* cited by examiner

KEY CYLINDER DEVICE

The present application is based on Japanese patent application No. 2015-001415 filed on Jan. 7, 2015, the entire contents of which are incorporated herein by reference.

BACKGROUND OF THE INVENTION

1. Field of the Invention

The invention relates to a key cylinder device and, in particular, to a key cylinder device provided with tumblers to be aligned by insertion of a key.

2. Description of the Related Art

A key cylinder device used for, e.g., a vehicle steering lock device is known (see e.g., JP-B-3346706).

The key cylinder device disclosed in JP-B-3346706 is provided with a cylinder lock in which an inner cylinder is inserted into an outer cylinder from the rear side (steering lock device side) so as to be rotatable. The cylinder lock is configured such that a lock pin provided to protrude from the inner surface of the outer cylinder butts against a flange-shaped portion formed on the rear side of the inner cylinder while the flange-shaped portion of the inner cylinder butts against a step portion formed inside a body of the steering lock device, and the inner cylinder is thereby prevented from moving toward the rear side.

SUMMARY OF THE INVENTION

In general cylinder locks, a play-preventing rubber packing is press-fitted, in a direction along the side surface, to a packing insertion portion formed on the outer peripheral surface of the outer cylinder. The rubber packing is interposed between the lock body and the outer cylinder housed and fixed therein so as to prevent the outer cylinder from wobbling inside the lock body.

The play (or lost motion) prevention structure in which the rubber packing is press-fitted to and fixed on the outer peripheral surface of the outer cylinder is poor in assembly workability of the rubber packing since the rubber packing is press-fitted in a direction along the side surface of the outer cylinder. In addition, it is necessary for the outer cylinder to have a shape which does not have an undercut portion upon opening a mold in order to demold the outer cylinder with the packing insertion portion that is simultaneously and integrally molded therewith.

It is an object of the invention to provide a key cylinder device that has a play prevention structure and is excellent in assembly workability of a packing member while having no undercut portion.

(1) According to an embodiment of the invention, a key cylinder device comprises:

a key cylinder attached inside a cylinder portion of a cylindrical mounting member and locked/unlocked by a mechanical key; and a packing insertion portion that is integrally formed on an outer surface of the key cylinder so as to have a shape without an undercut portion and comprises an opening for insertion of a packing member in a vertical direction along the outer surface.

In the above embodiment (1) of the invention, the following modifications and changes can be made.

(i) The packing insertion portion comprises slip-off preventing engagement portions and a coupling portion and has a shape such that an undercut portion is not present when opening a mold, front end portions of the engagement portions facing each other and the coupling portion coupling between lower edges of the engagement portions, and wherein a housing space is formed between the engagement portions and the coupling portion so as to fit and fix the packing member through the opening.

(ii) The mounting member comprises a packing slip-off preventing recess for preventing the packing member from slipping out of the opening.

(iii) A bottom surface of the packing slip-off preventing recess comprises an upwardly-inclined surface to guide the packing member into the packing slip-off preventing recess against an elastic force when the key cylinder is inserted and fixed inside the cylinder portion of the mounting member.

(iv) The key cylinder comprises a rotor, a rotor case and a cylindrical sleeve, the rotor resiliently mounting tumblers that are aligned by insertion of the mechanical key, the rotor case rotatably housing the rotor that is inserted in a direction opposite to an insertion direction of the mechanical key, and the sleeve being arranged around an outer peripheral surface of the rotor and fixed to an inner surface of the rotor case, and wherein the sleeve comprises holes that allow the tumblers to be disengaged when the mechanical key is inserted and to be engaged when the mechanical key is extracted.

(v) The key cylinder comprises a rotor and a rotor case, the rotor resiliently mounting tumblers that are aligned by insertion of the mechanical key, the rotor case rotatably housing the rotor that is inserted in a direction opposite to an insertion direction of the mechanical key, and wherein the packing insertion portion is integrally formed with the rotor case outside the rotor case.

(vi) An insertion direction of the packing member into the packing insertion portion is perpendicular to a longitudinal direction of the key cylinder.

(vii) The packing member comprises an attachment portion having a substantially same shape as the housing space and a packing portion protruding from the attachment portion in a radial direction of the key cylinder.

Effects of the Invention

According to an embodiment of the invention, a key cylinder device can be provided that has a play prevention structure and is excellent in assembly workability of a packing member while having no undercut portion.

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

A preferred embodiment of the invention will be specifically described below in conjunction with the appended drawings. In the following description, front means a key insertion hole side of a key cylinder, rear means a rear side of the key insertion hole, and upper, lower, left and right are directions when viewing the key insertion hole from the front.

General Configuration of Key Cylinder Device

Figure 1:
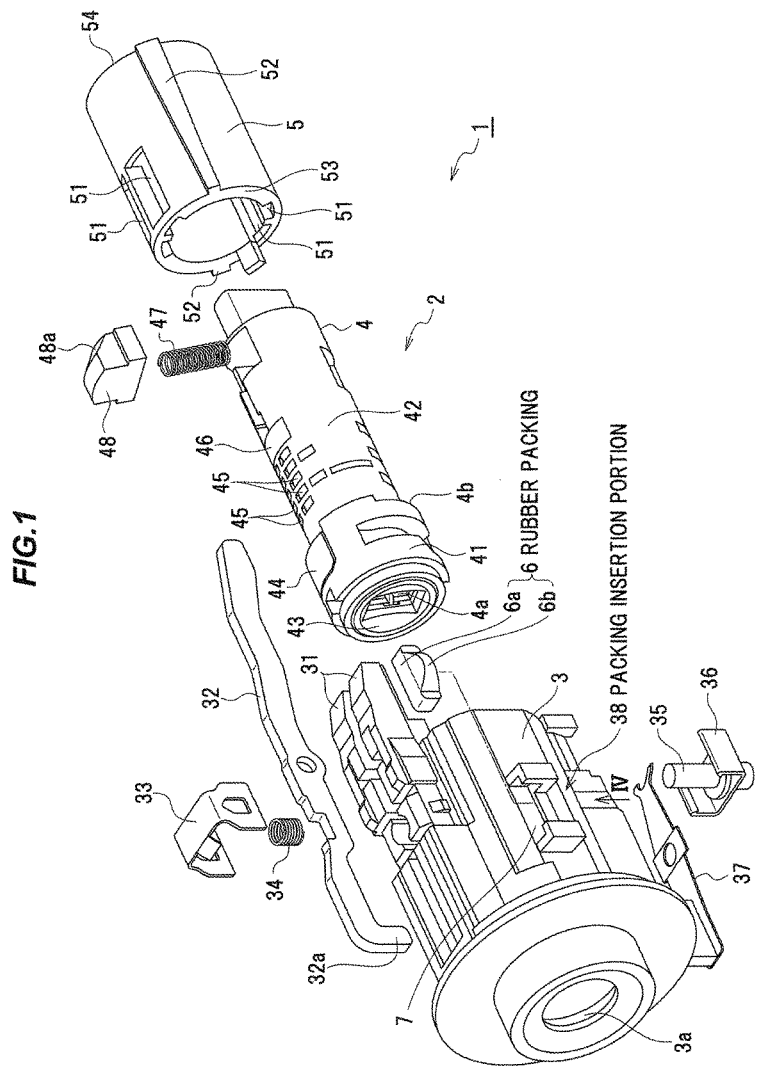
FIG. 1 is an exploded perspective view showing a key cylinder device in a preferred embodiment of the present invention.

FIG. 1 shows a configuration example of a typical key cylinder device in the present embodiment which is indicated generally by the reference numeral 1. The key cylinder device 1 is provided in a steering lock device which disables a rotating operation of a column shaft (not shown) when a vehicle is parked.

The key cylinder device 1 in the illustrated example is provided with a key cylinder 2 capable of mechanical authentication of a mechanical key (not shown) (hereinafter, referred to as "key"). The key cylinder 2 is provided with a cylindrical rotor case 3 and a columnar rotor 4. The rotor case 3 has an opening at an end on the opposite side to a key insertion hole 4a into which a key is inserted. The rotor 4 is rotatably housed in the rotor case 3. The rotor 4 is assembled to the rotor case 3 in a direction opposite to a key insertion direction and this increases resistance of the rotor 4 against being pulled out from the rotor case 3.

The key cylinder 2 has the key insertion hole 4a formed along a direction of a rotor rotation axis. Rotational operation of the key changes the position of the key cylinder 2 between first to fourth positions which are an LOCK position, an ACC (accessory) position, an ON position and a START position in a clockwise direction as viewing the key insertion hole 4a from the front.

The steering lock device is locked when the key cylinder 2 is located at the LOCK position, and is unlocked when the key cylinder 2 is located at any position from the ACC position to the START position.

The key cylinder 2 is coupled to a camshaft which is a component of the steering lock device to operate an ignition switch (not shown). When the key cylinder 2 is rotationally operated from the LOCK position through the ACC position to the ON position or the START position, connection of the contact point of the ignition switch is switched via the camshaft. Based on the connection state of the ignition switch changed by the switching operation, the status of various on-vehicle devices and an engine is switched.

Configuration of Rotor Case

Figure 2:
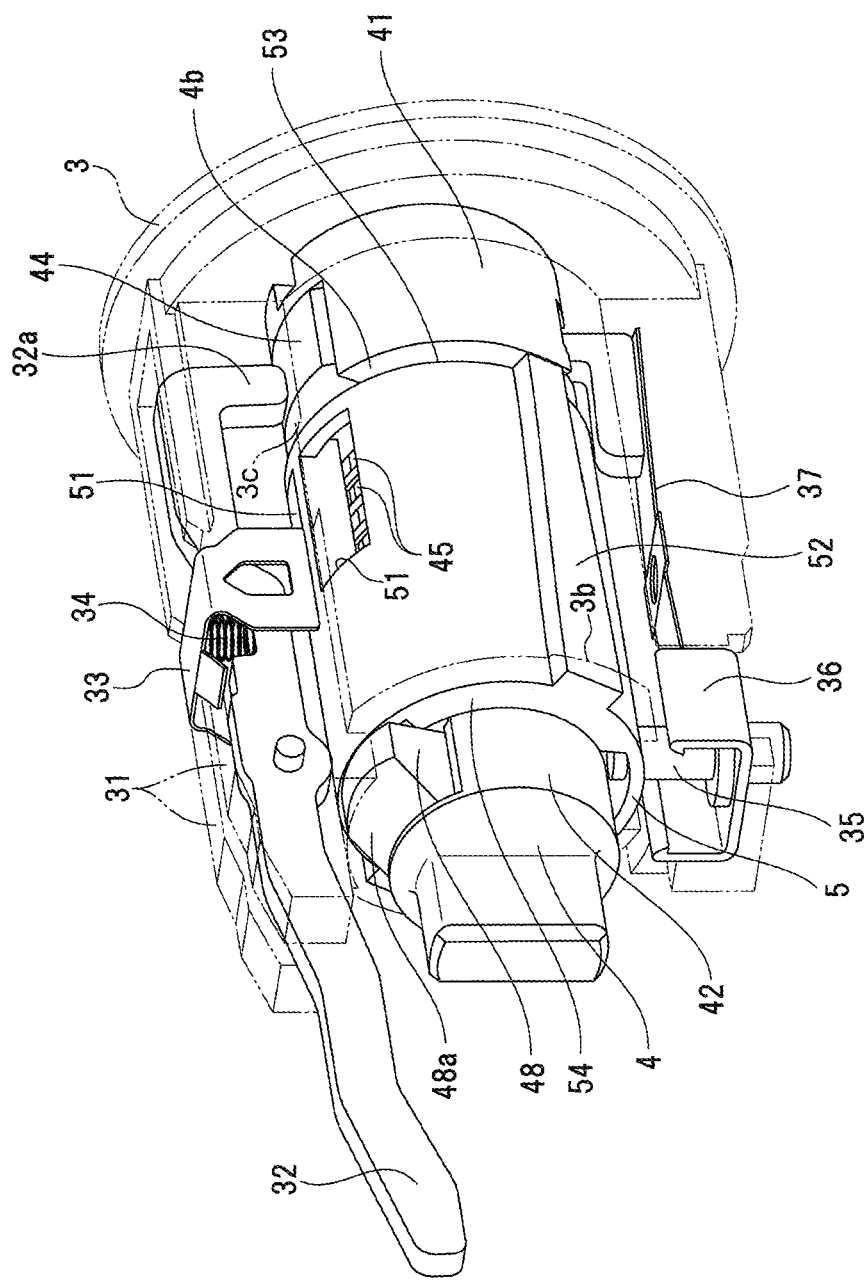
FIG. 2 is a partial perspective view showing the inside of the key cylinder device in the embodiment.
Figure 3A:
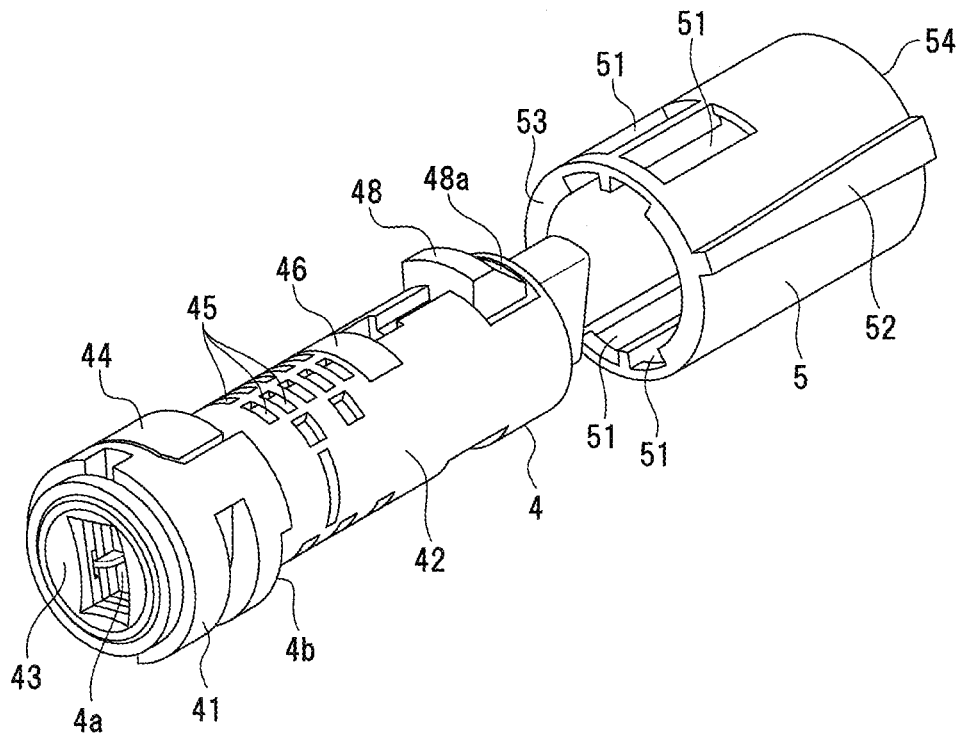
FIGS. 3A and 3B are exploded perspective views of the main section showing an assembly process of the key cylinder device in the embodiment.
Figure 3B:
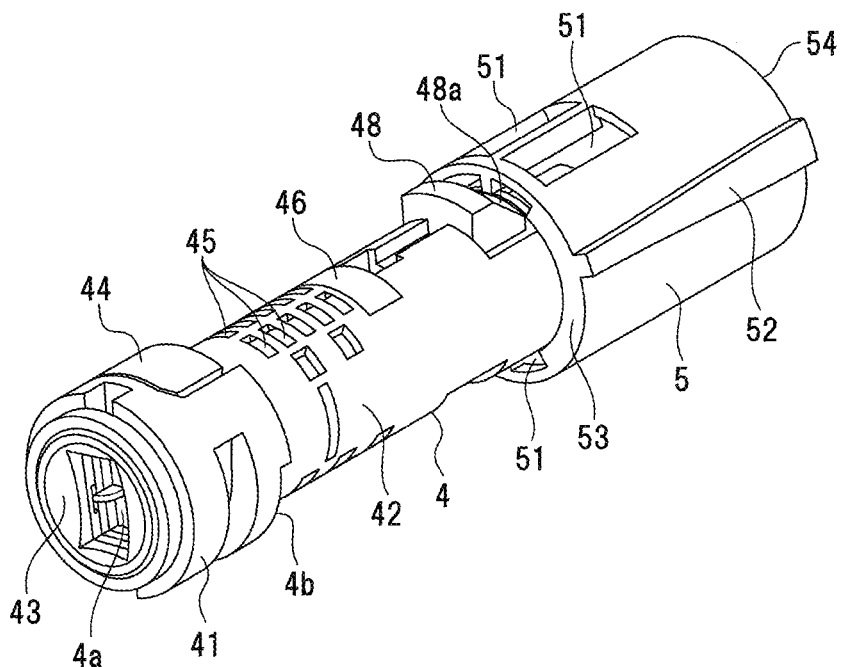
Figure 4:
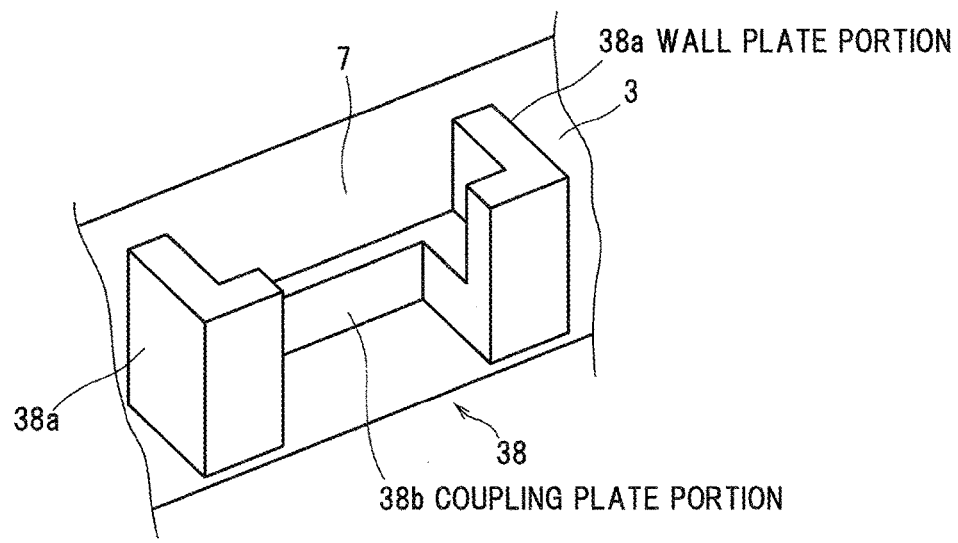
FIG. 4 is a partial perspective view showing a play prevention structure of the key cylinder device in the embodiment as viewed in a direction of an arrow IV of FIG. 1.

As shown in FIGS. 1 and 2, the rotor case 3 is formed of a cylindrical member with a circular flange-shaped case and has a key operation hole 3a on a flange portion. A constituent material of the rotor case 3 is, e.g., a metal material such as die-cast zinc, or a resin material such as polybutylene terephthalate (PBT) resin mixed with glass fibers.

Two support walls 31 defining a recess therebetween along a key insertion direction are formed on an upper peripheral portion of the rotor case 3, and a locking lever 32 is pivotally supported between the support walls 31. The locking lever 32 has, e.g., a key insertion detection function for detecting insertion of a key and a lock function for holding a locking member such as locking bar or lock stopper which enables or disables a rotating operation of the column shaft.

To the locking lever 32, a coil spring 34 is attached in a state of being covered with a cover plate 33 having a pair of leg portions fixed to the rotor case 3. The locking lever 32 is pressed toward the rotor 4 by a spring force of the coil spring 34.

A stopper pin 35 used to attach the key cylinder 2 to a lock body (not shown) penetrates the lower peripheral portion of the rotor case 3 so as to be movable in a radial direction of the rotor. The stopper pin 35 is attached to a stopper cover 36 having a pair of leg portions fixed to the rotor case 3 and is pressed toward the lock body by an elastic force of a lever 37 fixed at one end to the rotor case 3.

Configuration of Rotor

As shown in FIGS. 1 and 2, the rotor 4 has a shape with a step such that a large diameter rotor portion 41 having a key insertion detection function and a small diameter rotor portion 42 having a key checking function for checking a mechanical match of a key are integrally coupled with a level difference portion therebetween.

A front cover 43 having a key insertion slot is housed in and fixed to a front opening of the large diameter rotor portion 41. A sliding piece 44 is housed in the peripheral portion of the large diameter rotor portion 41 so as to be movable in a radial direction of the rotor when inserting/extracting the key. A bent piece 32a formed by bending a front end of the locking lever 32 is arranged to face the outer surface of the sliding piece 44.

Meanwhile, plural tumblers 45 having a plate shape elongated in a radial direction and a locking piece 46 for preventing rotation of the camshaft are housed inside the small diameter rotor portion 42 so as to be resiliently retractable. A tumbler hole (not shown) to be engaged with a groove of the key is formed on each tumbler 45. The tumblers 45, when engaged with the key grooves through the tumbler holes, are thereby elastically held inside the small diameter rotor portion 42 at a predetermined position to be a key checking position for checking a mechanical match of the key.

In the state that the key is not inserted into the small diameter rotor portion 42, protruding end portions of the tumblers 45 protrude beyond the outer peripheral surface of the small diameter rotor portion 42 and rotation of the rotor 4 is restricted by engagement of the protruding end portions with the inner peripheral surface of the rotor case 3.

In the state that the key is inserted into the key insertion hole 4a, the tumblers 45 engaged with the grooves of the key all retract inward beyond the outer peripheral surface of the rotor 4. As a result, the rotor 4 can be rotationally operated without contact of any tumblers 45 with the inner peripheral surface of the rotor case 3.

A rectangular bottle cap-shaped stopper member 48 is arranged on the rear peripheral portion of the small diameter rotor portion 42 via a coil spring 47. The stopper member 48 is pressed outward in a radial direction of the rotor by a spring force of the coil spring 47 and prevents the rotor 4 from being pulled out from the front of the rotor case 3. A decrease in attack resistance of the rotor 4 against being pulled out is prevented by the stopper member 48. The stopper member 48 is preferably used when the rotor case 3 is formed of a resin material.

Compatible Configuration of Rotor Case

The shape and number of the tumblers 45 are different depending on the shape of key, and the rotor 4 needs to be changed according to the shape and number of the tumblers 45. Then, changing the rotor 4 involves change of the shape of the rotor case 3 since the key insertion detection function and the lock function of the locking lever 32 are realized by the shape of the rotor case 3.

Based on this, a cylindrical metal sleeve 5 is used in the present embodiment to allow the rotor case 3 to have compatibility even when the rotor 4 is changed to match a different shape of key. The position of the sleeve 5 to restrict rotation of the rotor 4 is set to correspond to a changed key shape.

Two tumbler holding holes 51 having a long shape elongated in the direction of the rotor rotation axis and arranged side by side are formed on each of two opposing sides of the sleeve 5 so as to penetrate the peripheral portion of the sleeve 5. The tumbler holding holes 51 serve to allow the protruding end portions of the tumblers to be disengaged when the key is inserted, and to be engaged when the key is extracted.

The sleeve 5 is formed to have a size (outer diameter) and a thickness which match the shape of a key to be used and the type and number, etc., of the tumblers 45, and the suitable number of the tumbler holding holes 51 having a suitable size and arranged at suitable positions are selected and used according to the shape of the key to be used and the type and number, etc., of the tumblers 45. It is therefore obvious that the positions and number, etc., of the tumbler holding holes 51 are not limited to those in the illustrated example.

The rotor 4 is inserted into the sleeve 5 which is thus placed around the outer peripheral surface of the small diameter rotor portion 42, and the key cylinder 2 has a multiple cylindrical wall structure composed of the rotor case 3, the rotor 4 and the sleeve 5. Guide ribs 52 extending and tapering in the insertion direction are formed to protrude from the outer peripheral surface of the sleeve 5 at two opposing positions and are inserted into and fixed to guide recesses 3b formed on the inner peripheral surface of the rotor case 3.

An opening end face 53 located on the front side of the sleeve 5 is configured as a stopping surface which comes into contact with an annular step surface 4b formed between the large diameter rotor portion 41 and the small diameter rotor portion 42 and also with an annular stepped portion 3c formed on the inner peripheral surface of the rotor case 3 and located behind the flange portion, and thereby prevents the rotor 4 from being pulled out. Meanwhile, a rear end portion of the sleeve 5 is configured as a stopping portion to which the stopper pin 35 penetrating the lower peripheral portion of the rotor case 3 is fitted and fixed and which thereby prevents the pull-out.

A decrease in attack resistance of the rotor 4 against being pulled out is prevented by the opening end face 53 of the sleeve 5, the annular stepped portion 3c of the rotor case 3, the step surface 4b of the rotor 4 and the stopper pin 35.

The opening end face 53 located on the front side of the sleeve 5 is configured as a stopping surface which prevents the rotor 4 from being pulled out, and in addition, an opening end face 54 located on the rear side of the sleeve 5 is configured as a stopping surface which comes into contact with a front end face of the stopper member 48 and thereby prevents the rotor 4 from being pulled out. The stopper member 48 prevents a decrease in attack resistance of the rotor 4 against being pulled out and a decrease in attack resistance caused when using the resin rotor case 3. Thus, attack resistance is improved such that the rotor 4 cannot be pulled out even when the flange portion of the rotor case 3 is broken.

As shown in FIGS. 1 to 3B, an inclined surface 48a inclined downward is formed on a rear end of the stopper member 48. When the sleeve 5 is pushed in against the spring force of the coil spring 47 so as to cover the outer peripheral surface of the rotor 4 in a state that the inclined surface 48a faces toward the opening end face 54 located on the rear side of the sleeve 5, the stopper member 48 receives a downward component of force on the inclined surface 48a and travels inside the cylinder of the sleeve 5 while sinking down.

Once the sleeve 5 passes over the inclined surface 48a of the stopper member 48, the opening end face 54 located on the rear end side of the sleeve 5 comes into contact with the front end face of the stopper member 48 while the opening end face 53 located on the front end side of the sleeve 5 comes into contact with the step surface 4b of the rotor 4, and the stopper member 48 returns to the original position due to a restoring force of the coil spring 47. This restricts the rotor 4 from separating from the sleeve 5.

Play Prevention Structure of Rotor Case

As shown in FIGS. 1, 4 and 5A to 5C, the rotor case 3 formed of a resin material is housed and fixed, via a rubber packing 6 as a play-preventing packing member, inside a cylindrical lock body 8 as a mounting member which is formed of a metal material such as die-cast zinc.

In case that the rotor case 3 mounting the rubber packing 6 on the outer wall portion thereof and a packing insertion portion 38 for receiving the rubber packing 6 press-fitted thereto are simultaneously and integrally molded by injection molding, an undercut portion should not be present when opening a mold such that the packing insertion portion 38 can be demolded after the injection molding, and also, sufficient draft needs to be provided at the time of injection molding.

The packing insertion portion 38 not having an undercut is formed to protrude from a lock body-facing surface of the rotor case 3. Meanwhile, the rubber packing 6 is composed of a substantially rectangular attachment portion 6a and a substantially hemispherical packing portion 6b protruding from a side of the attachment portion 6a.

The packing insertion portion 38 is provided with a pair of wall plate portions 38a as slip-off preventing engagement portions and a coupling plate portion 38b. Front end portions of the wall plate portions 38a face each other, and the coupling plate portion 38b couples between lower edges of the wall plate portions 38a. An opening for inserting the rubber packing 6 in a vertical direction of the rotor case 3 is formed between the pair of wall plate portions 38a, and a housing space 7 for housing the attachment portion 6a of the rubber packing 6 is formed between the pair of wall plate portions 38a and the coupling plate portion 38b. The rubber packing 6 having a substantially rectangular parallelepiped shape is fitted to the housing space 7 through the opening between the pair of wall plate portions 38a and the rubber packing 6 is fixed such that the packing portion 6b is tightly pressed against the outer surface of the lock body 8.

The packing insertion portion 38 is molded using a mold not having an undercut shape. The molding process is easier since the packing insertion portion 38 does not have an undercut shape.

Figure 5A:
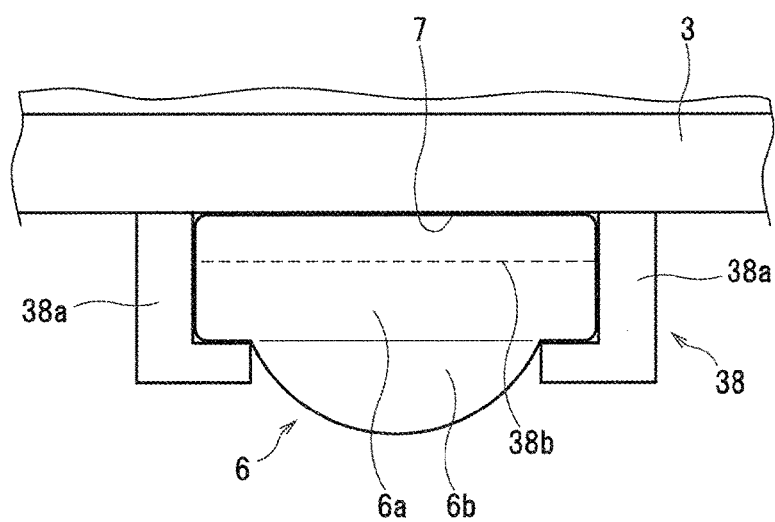
FIG. 5A is a plan view showing a mounted state of a play-preventing packing member of the key cylinder device in the embodiment.
Figure 5B:
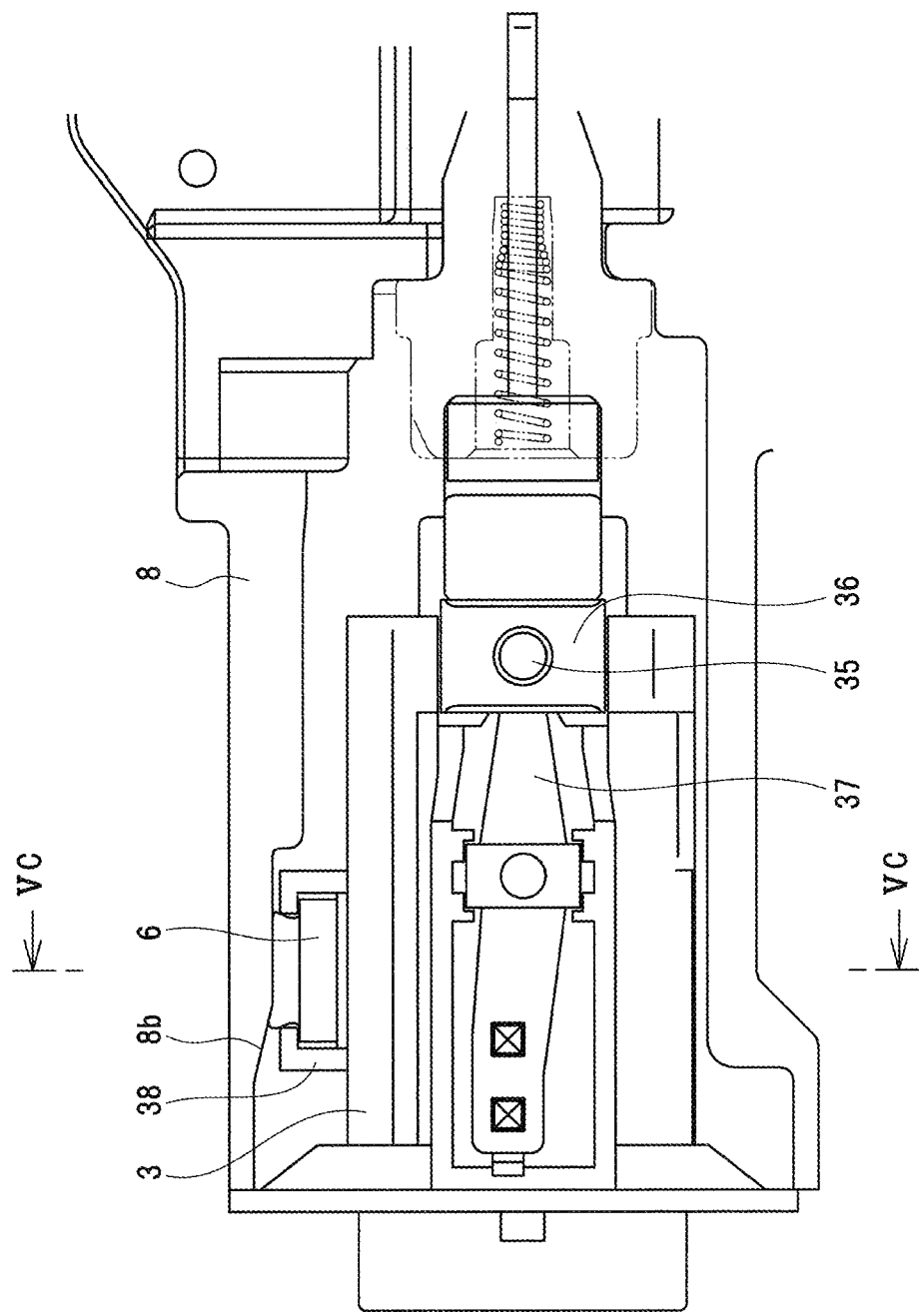
FIG. 5B is a bottom view showing the key cylinder device in the embodiment attached to a mounting member.
Figure 5C:
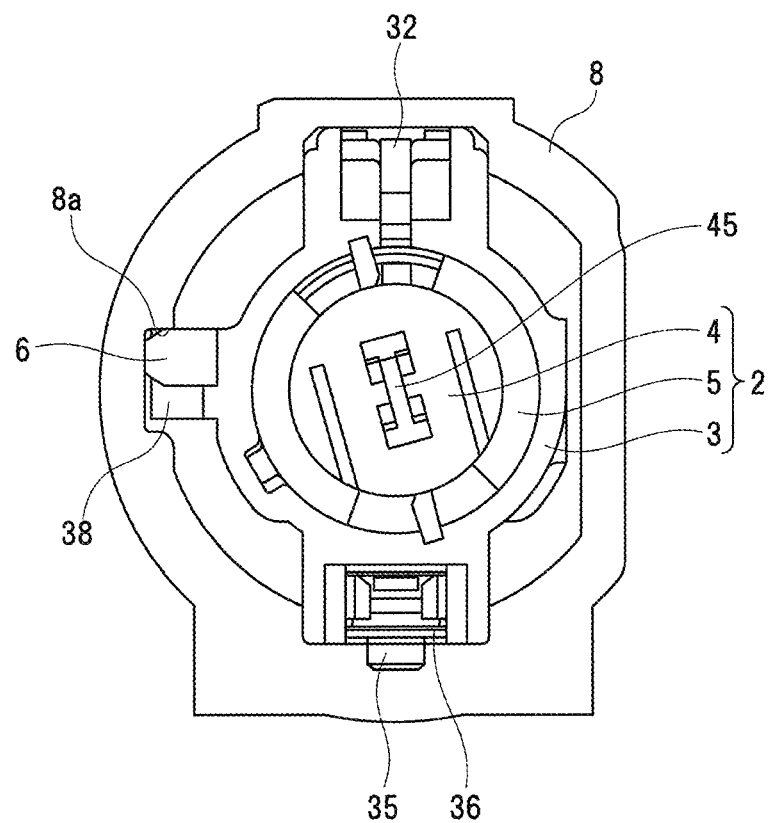
FIG. 5C is an illustration diagram as viewed in a direction of an arrow VC of FIG. 5B.

As shown in FIGS. 5B and 5C, a packing slip-off preventing recess 8a is formed inside a cylinder portion of the lock body 8 to prevent the rubber packing 6 from slipping out of the opening between the pair of wall plate portions 38a. An upwardly-inclined surface 8b is formed on a bottom surface of the packing slip-off preventing recess 8a so as to be inclined upward in the insertion direction of the rotor case 3.

The upwardly-inclined surface 8b is configured as a guide surface to guide the rubber packing 6 into the packing slip-off preventing recess 8a against an elastic force when the rotor case 3 is inserted and fixed inside the cylinder portion of the lock body 8. Since the upwardly-inclined surface 8b allows the rubber packing 6 to be smoothly introduced without applying an excessive force during a process of inserting the rubber packing 6 into the packing slip-off preventing recess 8a, it is possible to reduce an insertion force at the time of inserting the rotor case 3 into the cylinder portion of the lock body 8. By reducing the force to insert the rotor case 3, it is possible to improve assembly workability of the key cylinder 2 to the lock body 8.

Effects of the Embodiment

The key cylinder device 1 configured as described above exerts the following effects, in addition to the effects described above.

(1) The molding process is easier since the packing insertion portion 38 does not have an undercut shape. A complicated structure for undercut processing does not need to be provided to the mold and this allows the molding process to be easy and low cost.

(2) The rubber packing 6 is fixed simply by press-fitting into the housing space 7 of the packing insertion portion 38. This assembly work is simple and work efficiency is also improved.

(3) It is acceptable to reduce the accuracy level of components having the key insertion detection function and the lock function in case that the shape of a key to be used and the type and number, etc., of the tumblers 45 are changed, and it is thus possible to suppress the cost increase.

(4) Even when the rotor 4 is changed to match a different key shape, it is possible to reduce the types of components since the sleeve 5 has a function of allowing the rotor case 3 to have compatibility.

(5) Since it is possible to reduce the types of components, it is possible to reduce frequency of changing setup for component assembly and thus possible to reduce man-hours to assemble the components.

(6) In case that the rotor case 3 is formed of a resin material, secondary processing is not required and it is thus possible to reduce the manufacturing cost and also to reduce the weight of the key cylinder 2.

Although the key cylinder device 1 is applied to a car in the typical configuration example of the invention, it is not limited thereto. It is obvious that the invention can be effectively applied to, e.g., various vehicles such as construction machineries and agricultural machineries.

It is obvious from the above description that the invention according to claims is not to be limited to the typical embodiment and illustrated example of the invention. Therefore, it should be noted that all combinations of the features described in the embodiment and illustrated example are not necessary to solve the problem of the invention.

What is claimed is:
1. A key cylinder device, comprising:
a cylindrical mounting member;
a key cylinder attached inside a cylinder portion of the cylindrical mounting member and locked/unlocked by a mechanical key;
a packing member disposed between the cylindrical mounting member and the key cylinder, and
a packing insertion portion that is integrally formed on an outer surface of the key cylinder and which protrudes from the outer surface toward the cylinder portion of the cylindrical mounting member and comprises an opening for receiving the packing member within the packing insertion portion in a tangential direction along the outer surface.

2. The key cylinder device according to claim 1,
wherein the packing insertion portion comprises slip-off preventing engagement portions and a coupling portion, the engagement portions having front end portions that each other, and the coupling portion coupling between lower edges of the engagement portions, and
wherein a housing space is formed between the engagement portions and the coupling portion so as to fit and fix the packing member through the opening.

3. The key cylinder device according to claim 1, wherein the mounting member comprises a packing slip-off preventing recess for preventing the packing member from slipping out of the opening.

4. The key cylinder device according to claim 3, wherein a bottom surface of the packing slip-off preventing recess comprises a surface inclined with respect to an axis of rotation of the cylinder portion to guide the packing member into the packing slip-off preventing recess against an elastic force when the key cylinder is inserted and fixed inside the cylinder portion of the mounting member.

5. The key cylinder device according to claim 1,
wherein the key cylinder comprises a rotor, a rotor case and a cylindrical sleeve, the rotor resiliently mounting tumblers that are aligned by insertion of the mechanical key, the rotor case rotatably housing the rotor, and the sleeve being arranged around an outer peripheral surface of the rotor and fixed to an inner surface of the rotor case, and
wherein the sleeve comprises holes that allow the tumblers to be disengaged when the mechanical key is inserted and to be engaged when the mechanical key is extracted.

6. The key cylinder device according to claim 1,
wherein the key cylinder comprises a rotor and a rotor case, the rotor resiliently mounting tumblers that are aligned by insertion of the mechanical key, the rotor case rotatably housing the rotor, and
wherein the packing insertion portion is integrally formed with the rotor case outside the rotor case.

7. The key cylinder device according to claim 1, wherein an insertion direction of the packing member into the packing insertion portion is perpendicular to a longitudinal direction of the key cylinder.

8. The key cylinder device according to claim 2, wherein the packing member comprises an attachment portion having a substantially same shape as the housing space and a packing portion protruding from the attachment portion in a radial direction of the key cylinder.

9. The key cylinder device according to claim 1, wherein all of the packing insertion portion protrudes from the outer surface of the key cylinder toward the cylinder portion of the cylindrical mounting member.

10. The key cylinder device according to claim 1, wherein the packing insertion portion comprises slip-off preventing engagement portions that retain the packing member in a radial direction with respect to the cylinder portion of the cylindrical mounting member.

* * * * *